Figure 1:
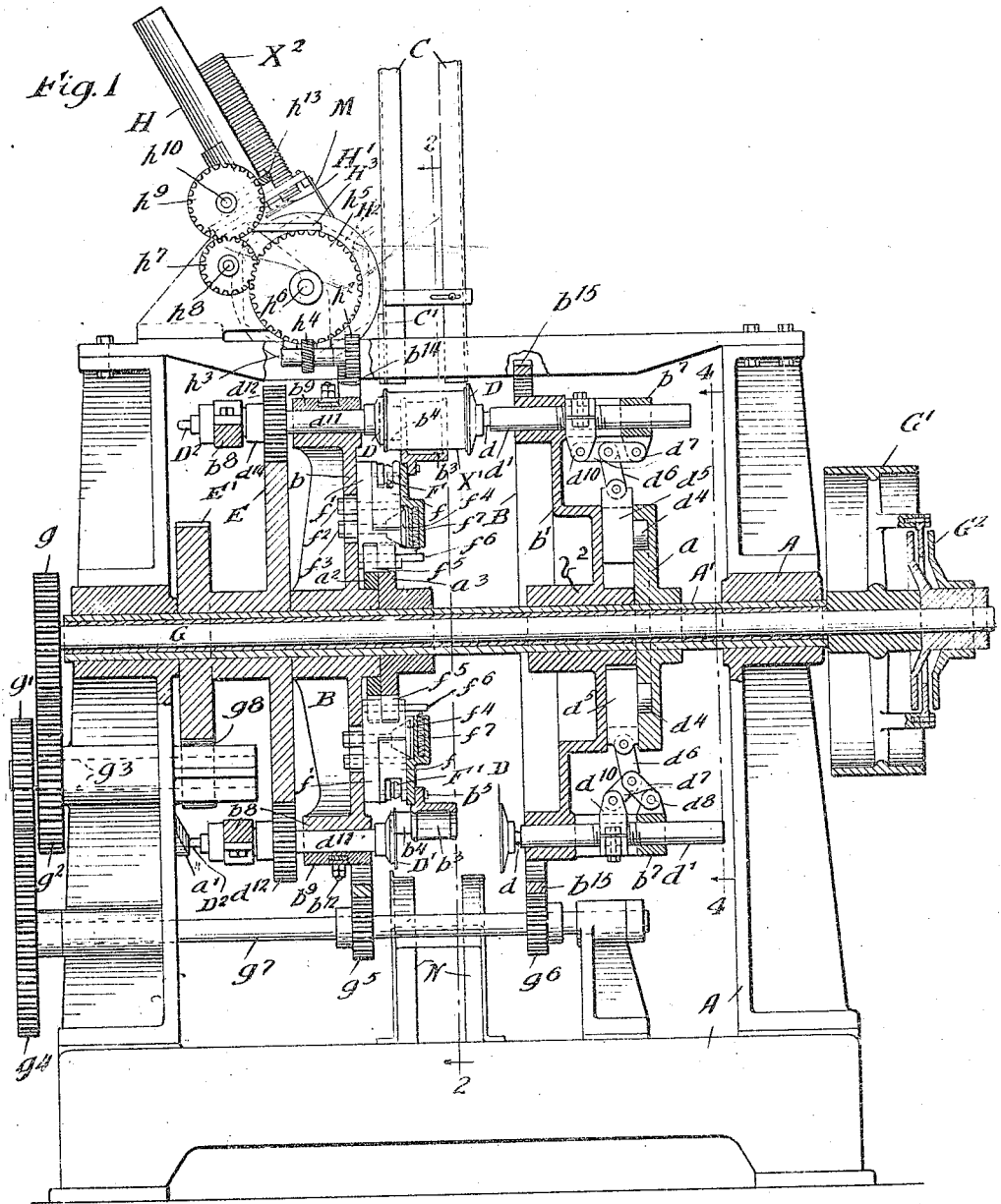

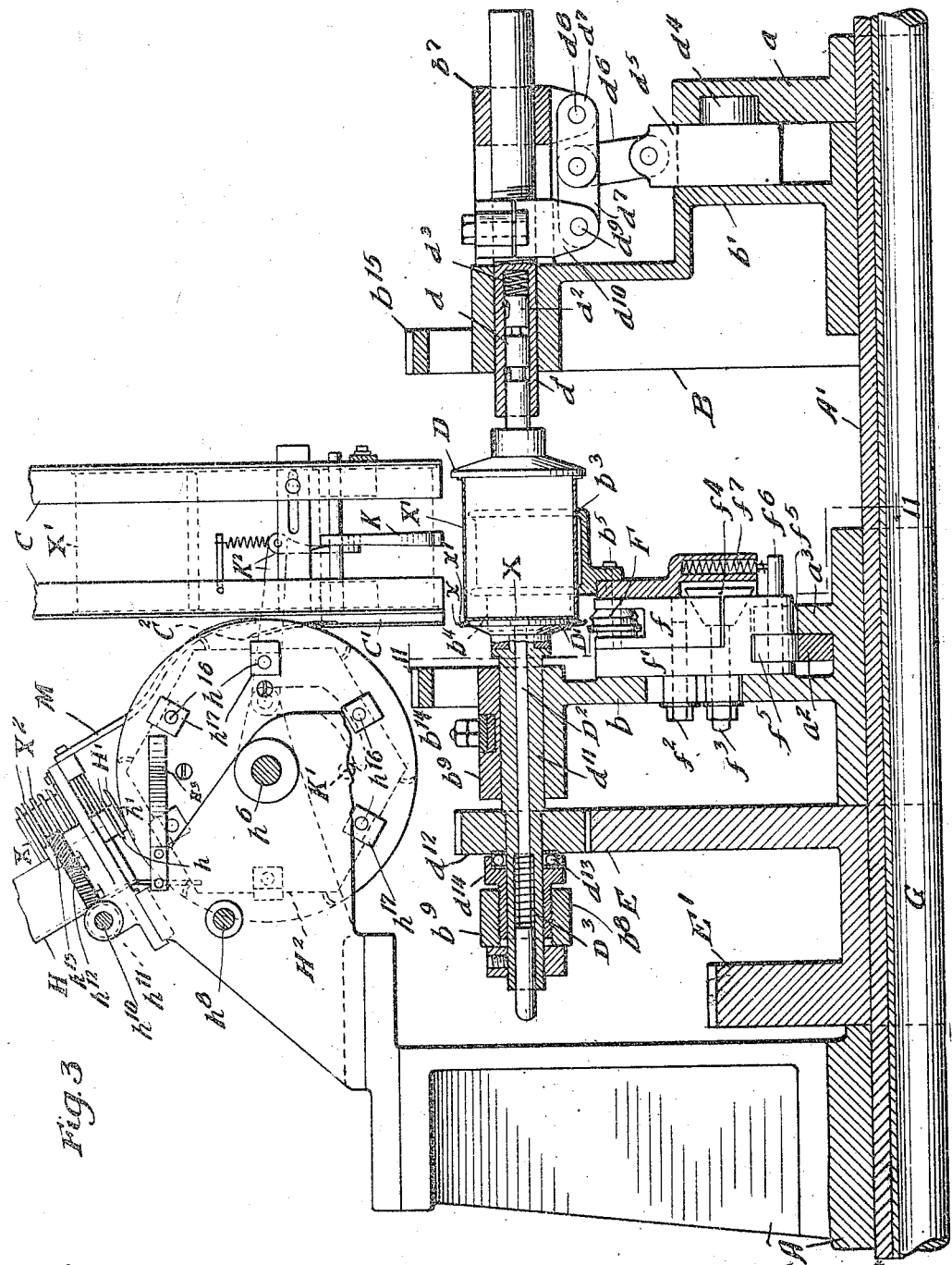

C. J. NELSON, O. OSTLIN & E. V. SWANGREN.
DOUBLE SEAMING MACHINE.
APPLICATION FILED MAR. 28, 1910.
1,161,953.
Patented Nov. 30, 1915.
6 SHEETS—SHEET 4.
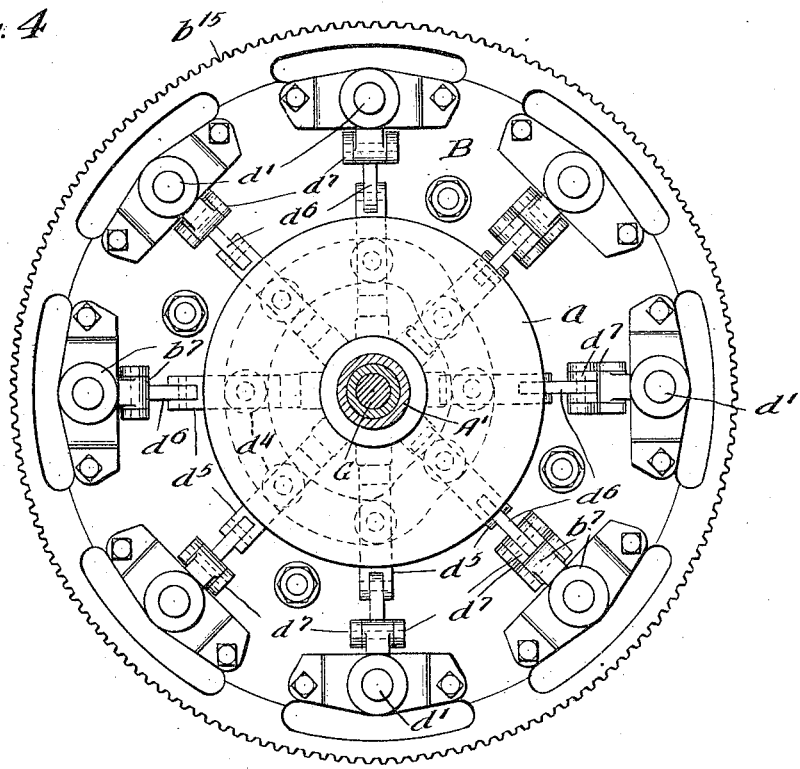
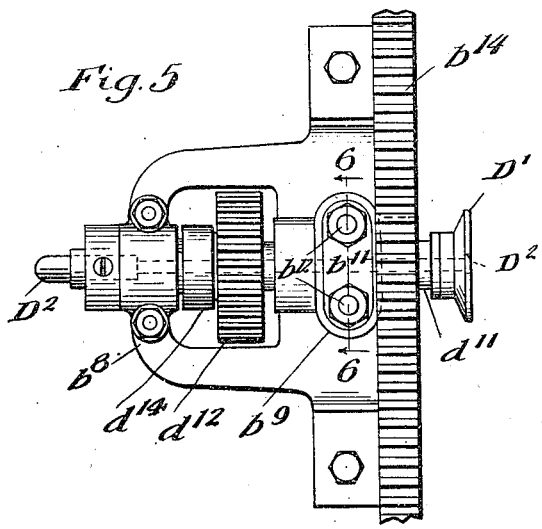
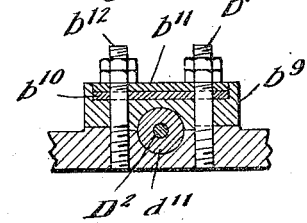

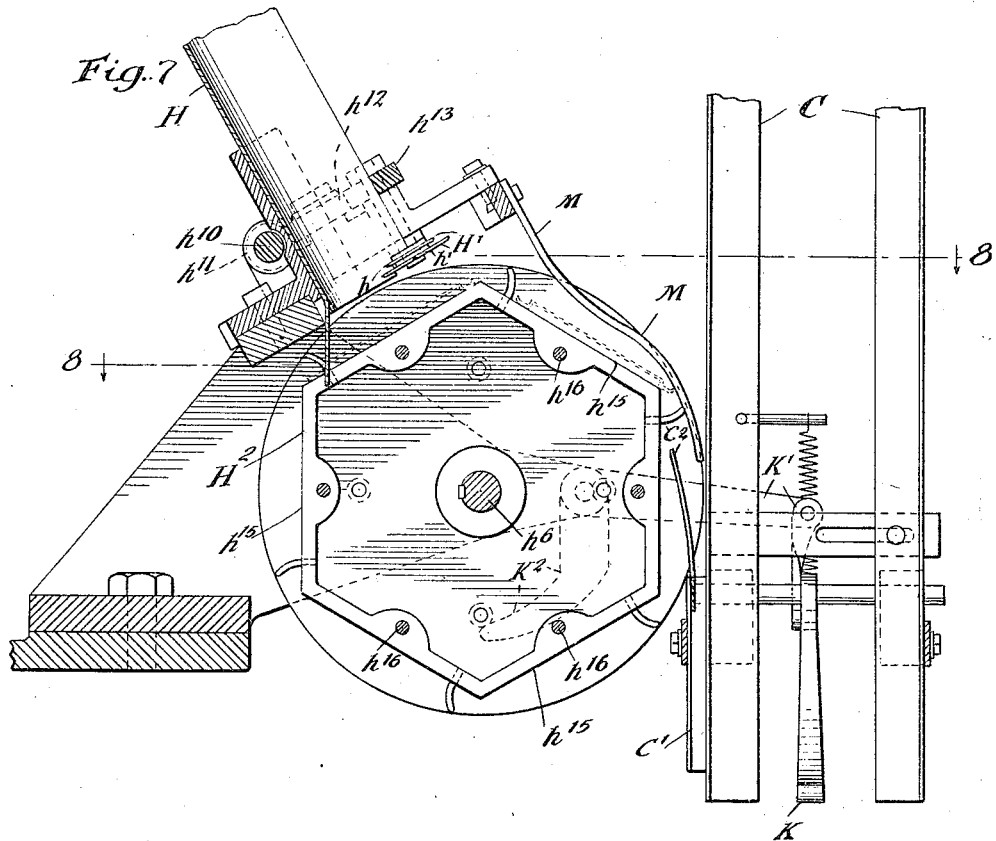

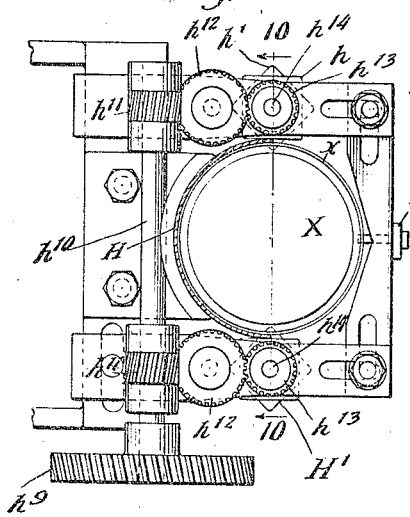
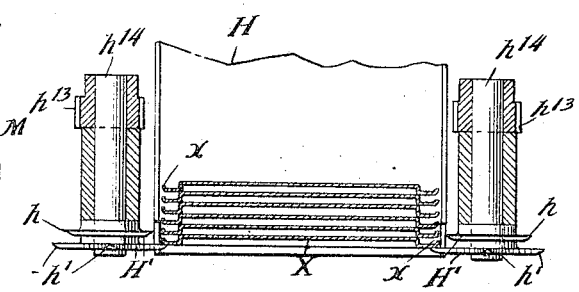
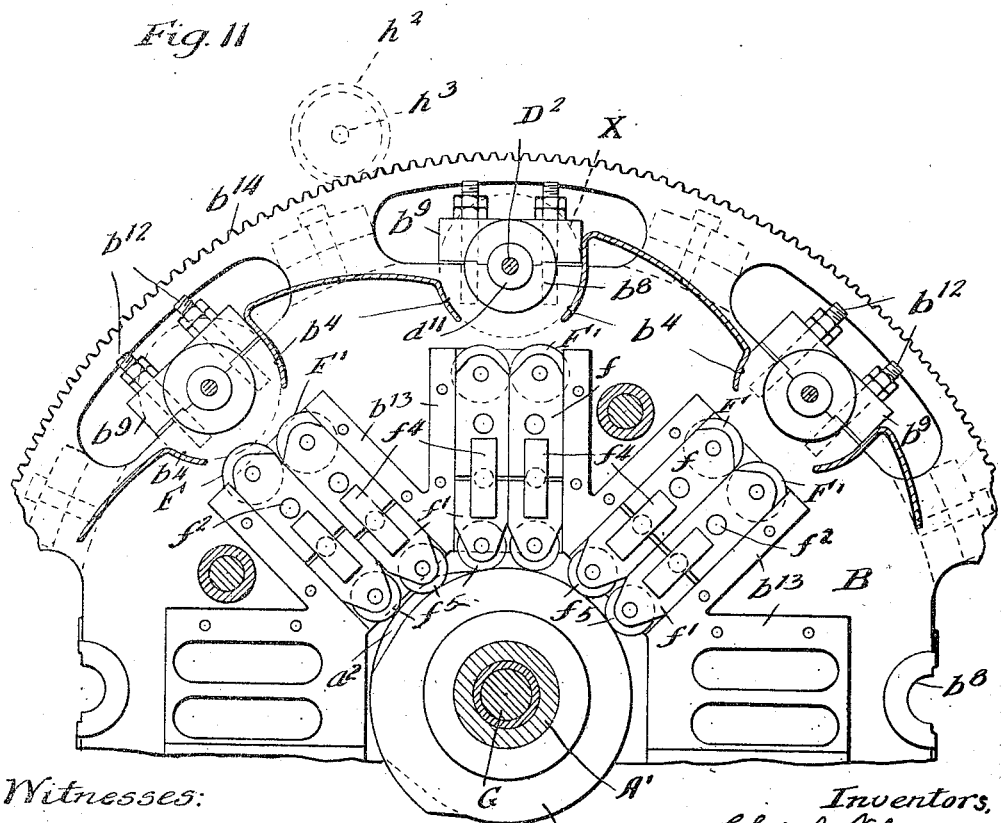

UNITED STATES PATENT OFFICE.

CHARLES J. NELSON, OLAF OSTLIN, AND EDWIN V. SWANGREN, OF MAYWOOD, ILLINOIS, ASSIGNORS TO AMERICAN CAN COMPANY, OF NEW YORK, N. Y., A CORPORATION OF NEW JERSEY.

DOUBLE-SEAMING MACHINE.

1,161,953.  Specification of Letters Patent.  Patented Nov. 30, 1915.

Application filed March 28, 1910. Serial No. 551,338.

*To all whom it may concern:*

Be it known that we, CHARLES J. NELSON, OLAF OSTLIN, and EDWIN V. SWANGREN, citizens of the United States, residing in Maywood, in the county of Cook and State of Illinois, have invented a new and useful Improvement in Double-Seaming Machines, of which the following is a specification.

Our invention relates to improvements in double seaming machines for seaming can heads to can bodies.

The object of our invention is to provide an automatic, continuous, rotary double seaming machine, suitable for use in the manufacture of food preserving cans of the kind commonly known as sanitary cans, and wherein the heads are hermetically secured to the bodies by folded or double seams without the use of solder, which will be of a simple, efficient and durable construction, and by means of which the can heads may be very rapidly and cheaply assembled with the bodies and united thereto by double seams which will be uniformly, certainly and reliably hermetically tight without the use of solder.

Our invention consists in the means we employ to practically accomplish this object or result, the same comprising in coöperative combination: a continuous rotating carrier turning on a horizontal axis and having a plurality of horizontally disposed can body receiving pockets into which the can body may feed by gravity from a can body chute as the carrier rotates continuously, and also provided with a plurality of can head seats for registering the can heads with the can bodies and into which the can heads may be fed or delivered one by one as the carrier rotates continuously, the carrier being furnished with a plurality of pairs of axially rotatable can holder chucks mounted thereon, one pair for each can body pocket of the carrier, and a plurality of sets of independently movable double seaming rollers mounted on the carrier, one set for each can body pocket of the carrier; means for operating the seaming rollers by direct pressure as the carrier rotates continuously, consisting preferably of a central stationary cam, and seaming roller slides interposed directly between the central stationary cam and the seam to be formed to cause the seams to be uniformly perfect and hermetically tight; means for reciprocating one of the can holder chucks of each pair as the carrier rotates, consisting preferably of a central stationary cam and toggle lever connections between the same and the operating sleeve of the rotary chuck; an external annular driving gear for the rotary turret; means for axially rotating one of the can holder chucks of each pair as the carrier rotates, consisting preferably of a central gear driven in the opposite direction from the turret, and meshing with the gears on the chuck spindles; a can body feed chute; a can head feed chute into which the can heads are delivered one by one; means for controlling the delivery of a can body to said carrier by the presence or absence of a can head in the can head chute, and thus preventing the delivery of a can body, unless a can head is also delivered simultaneously, into the pocket of the carrier, and thereby preventing all danger of a can body being seamed onto the rotary can holder chuck, as would occur if no can head was present and thereby cause stoppage and delay; a can head holder or receptacle; a can head feeder operating to feed, release or discharge the can heads one by one from the pile or stack of can heads in the holder; a supplemental can head feeder or delivery wheel interposed between the main can head feeder and the can head chute, and having a plurality of can head receiving seats; and means for operating said can head delivery device in unison with the carrier so as to cause the can heads to be intermittently delivered to the can head chute and carrier.

The invention further consists in the novel construction of parts and devices and in the novel combinations and subcombinations of parts and devices herein shown and described and more particularly specified in the claims.

Figure 2:
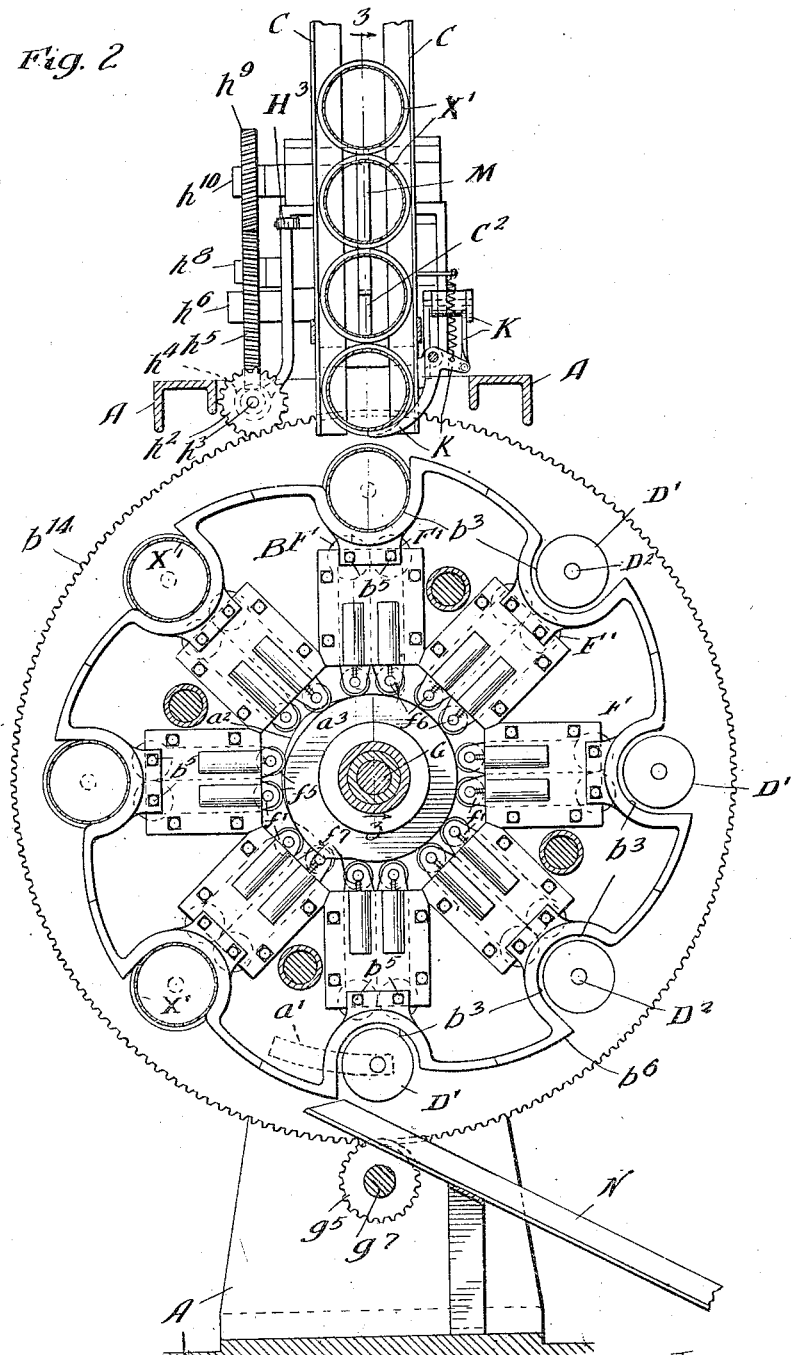

In the accompanying drawing forming a part of this specification, Figure 1 is a central, vertical, longitudinal section of a double seaming machine embodying our invention. Fig. 2 is a vertical section on line 2—2 of Fig. 1. Fig. 3 is a vertical section on line 3—3 of Fig. 2. Fig. 4 is a detail section on line 4—4 of Fig. 1. Fig. 5 is a detail plan view, showing one of the can holder chucks of the carrier. Fig. 6 is a detail section on line 6—6 of Fig. 5. Fig. 7 is an enlarged detail vertical section showing the can body and can head chutes and the main and supplemental can head feeders or delivery devices by which the can heads are delivered one by one to the can head chute. Fig. 8 is a detail plan view of same, partly in section on line 8—8 of Fig. 7. Fig. 9 is a detail plan view of the can head magazine or holder and can head feeder. Fig. 10 is a section on line 10—10 of Fig. 9. Fig. 11 is a detail section on line 11—11 of Fig. 3.

In the drawing, A represents the stationary frame of the machine, B a continuously rotating carrier, preferably consisting of two separate disks or heads $b$, $b^1$, each having a hub or bearing $b^2$, and mounted and turning upon the stationary or non-rotary hollow sleeve $A^1$ which is fixed to the frame of the machine. The rotary carrier B is provided with a plurality of can body receiving pockets $b^3$ and also with a plurality of can head seats $b^4$, each can head seat preferably consisting of a pair of projections, so that the seaming rollers may act between them against the seaming flanges of the can body and can head to form the seam. The can receiving pockets $b^3$ are preferably in separate pieces from the carrier disk or head $b$, and removably secured thereto by bolts $b^5$, so that they may be removed and replaced with others of different sizes for operation upon cans of different diameters. Each of these can receiving pockets or holders $b^3$ is provided with a curved rim or segment $b^6$, which supports the can bodies in the can body chute C as the carrier rotates under the same, thus causing one can body after another to feed or drop by gravity automatically into each can receiving pocket as it passes under the chute C. The can head chute $C^1$ is a short one and only adapted to receive or contain a single can head at a time. It is mounted closely adjacent to the can body chute, and is preferably fixed thereto.

The carrier B is provided with a plurality of pairs of axially rotatable can holder chucks D $D^1$, the former adapted to be reciprocated to clamp the can body and can head together, and the other adapted to be axially rotated to cause the can body and can head clamped between the chucks to axially rotate while the seam is being formed by the seaming rollers. The axially rotatable can holder chuck D has a stem $d$ mounted to rotate in the hollow sliding sleeve $d^1$ mounted in the carrier head or disk $b^1$, and which is furnished with a bearing block $d^2$ against which the end of the stem $d$ bears, said bearing block being controlled by a spring $d^3$ to give the chuck D a yielding clamping action against the can, and to accommodate slight variations in the length of the can bodies. The chuck sleeve or slide $d^1$ is reciprocated to clamp the can between the rotary chucks D $D^1$, preferably by means of a central stationary cam $a$ on the frame of the machine or its stationary sleeve $A^1$ which engages an anti-friction roller $d^4$ on a radial slide $d^5$, which is connected to the chuck operating sleeve $d^1$ by a link $d^6$ and toggle links $d^7$ $d^7$; one of which is pivoted at $d^8$ to a lug $b^7$ on the carrier B, and the other of which is pivoted at $d^9$ to an arm $d^{10}$, which is adjustably secured to the sliding sleeve $d^1$. The stem $d^{11}$ of the other rotary chuck disk $D^1$ is journaled in suitable bearings $b^8$ $b^9$ on the carrier disk or head $b$, and it is continuously rotated as the carrier B revolves, preferably by means of a gear $d^{12}$ on said stem or spindle $d^{11}$ which meshes with a central gear E, which is preferably driven in the opposite direction from the carrier B. A ball bearing $d^{13}$ is preferably interposed between the gear $d^{12}$ and the collar $d^{14}$ which is secured to the arms $b^8$ on the carrier head or disk $b$ to diminish the friction under the thrust of the opposing clamp chuck D.

To enable the can clamped between the axially rotatable chucks D $D^1$ to slightly yield against the thrust of the seaming rollers F $F^1$ to accommodate variations in thickness of the stock and to enable the seaming rollers to ride over the side seam of the can body without tendency to jump or chatter, and thus insure the production of hermetically tight and perfect double seams uniformly on every can, we mount the axially rotatable chucks $D^1$ in radially yielding outer bearings $b^9$. This is preferably done by interposing an elastic member $b^{10}$ between the bearings $b^9$ and the cap $b^{11}$ by which, through the bolts $b^{12}$, the bearing member $b^9$ is secured to the bearing member $b^8$ which is integral with the carrier disk or head $b$.

Each axially rotatable can holder chuck $D^1$ is furnished with a knockout or ejector $D^2$ for freeing the seamed can from the can holder chuck. This knockout $D^2$ extends through the hollow spindle of the chuck and is preferably actuated by a stationary cam $a^1$ on the frame of the machine with which the outer end of the ejector comes in contact as the carrier B rotates. A spring $D^3$ serves to hold the ejector $D^2$ normally retracted.

A plurality of sets of double seaming rollers F $F^1$ are mounted on the carrier B, one set for each can pocket of the carrier. The seaming roller F of each set serves to turn or fold the flange $x$ of the can head X over the flange $x^1$ of the can body $X^1$, and the other seaming roller $F^1$ of each set serves to finish the seaming operation and compress the folds of the seam closely and tightly together so as to produce an hermetically tight closure. To cause the seam to be certainly and uniformly tight, direct pressure is applied to actuate each of the seaming rollers of each set. This is preferably done by means of radially reciprocating seaming roller slides $f$ upon which the seaming rollers are journaled, and which are interposed directly between the central stationary cams $a^2$ $a^3$ on the frame sleeve $A^1$ and the can holder chuck $D^1$.

Each of the seaming roller slides $f$ is furnished with an adjustable member $f^1$ connected thereto by bolts $f^2$ $f^3$, the latter having a wedge shaped head $f^4$ fitting between the two members $f$ $f^1$ for effecting the adjustment and the opening for the other bolt in one of the members being enlarged sufficiently to permit of the very slight movement required for the necessary individual adjustment. Each of the seaming roller slides is furnished with an anti-friction roller $f^5$ for engagement with cams $a^2$ $a^3$, the roller being journaled by a pin $f^6$ on the adjustable member $f^1$ of the slide. The seaming roller slide reciprocates radially on the carrier in suitable guides $b^{13}$. A spring $f^7$ is interposed between the carrier B and each of the seaming roller slides, the spring preferably engaging the shaft $f^6$ of the anti-friction roller $f^5$ on each of the slides.

The carrier B is provided with exterior annular driving gears $b^{14}$ $b^{15}$, preferably formed integrally with the carrier heads or disks $b$ $b^1$, and motion is communicated thereto from the central driving shaft G, which extends through the central frame sleeve $A^1$, preferably through intermeshing gears, $g$ on said driving shaft, $g^1$ $g^2$ on the countershaft $g^3$ and $g^4$ $g^5$ $g^6$ on the supplemental shaft $g^7$, said gears $g^5$ and $g^6$ meshing with the external gears $b^{14}$ $b^{15}$ of the carrier B.

Motion is communicated to the main central gear E, by which the axially rotatable chucks $D^1$ are driven, from the countershaft $g^3$ through a gear $g^8$ thereon, which meshes with a gear $E^1$ on the hub of the gear E. The driving shaft G is furnished with a driving pulley $G^1$ and with a clutch $G^2$ for clutching the same to the driving shaft.

The can heads X are fed or discharged one by one from a pile or stack $X^2$ of can heads in the can head holder H by means of automatically operating rotary can head feeders $H^1$, upon the points, teeth or projections $h$ $h^1$ of which the pile of can heads in the holder rests. Each of the rotary feeders $H^1$ has two sets of can head supporting points or projections $h$ and $h^1$, one set being above or separated from the other the thickness of a can head, and the two sets of points $h$ $h^1$ being alternately arranged, so that as the feeder rotates the can heads in the pile or stack will be alternately supported by the upper and lower points, and the lowermost can head in the pile or stack discharged. The rotary star shaped can head feeders $H^1$ are continuously driven, preferably from the external annular gear $b^{14}$ on the carrier B through a gear $h^2$ on a shaft $h^3$ having a worm $h^4$ engaging a worm gear $h^5$ on the shaft $h^6$ which meshes with a gear $h^7$ on the shaft $h^8$, said last mentioned gear meshing with a gear $h^9$ on the shaft $h^{10}$, which carries a worm $h^{11}$ engaging a gear $h^{12}$ which engage a gear $h^{13}$ on the shaft $h^{14}$ of the rotary feeder $H^1$.

As the can heads are discharged one by one from the pile or stack $X^2$ by the rotary feeders $H^1$, they are delivered onto a supplemental can head feeder or delivery wheel $H^2$ which is interposed between the feeder $H^1$ and the can head chute $C^1$, the same being preferably of polygonal shape, and preferably having six can head receiving faces $h^{15}$, and which rotates continuously and serves to deliver the can heads one by one to the short can head feed chute $C^1$.

To prevent the can body from dropping or being fed from the can body chute C into the pocket of the carrier B as it passes under the can body chute, unless there is also a can head X in the short can head chute $C^1$ ready to be also fed to the carrier and thus prevent the flange of the can body being seamed onto the can head chuck, as would otherwise occur, we provide a can body feed controller K, preferably a movable finger or lever, adapted to be projected into the can body chute, and the operation of which is controlled by the presence or absence of a can head on the face of the supplemental feeder $H^2$ immediately above the can head chute $C^1$. To accomplish this, each of the can head seats on the supplemental feeder $H^2$ is provided with a movable pin or device $h^{16}$ having a member $h^{17}$ adapted to engage the can head on the can head seat or face of the delivery wheel $H^2$ if one is present; and if no can head is present, to be further moved and engage the arm $K^1$ of the operating lever $K^2$ of the can body feed controller K and thus cause the rotation of the supplemental can head feeder $H^2$ to operate the can body feed controller K. The pin or movable device $h^{16}$, as the supplemental feeder $H^2$ revolves, engages a light spring $H^3$ on the stationary frame. If a can head is present on the face of the supplemental feeder, the spring $H^3$ is pushed out of the way by the pin or movable stop device $h^{16}$, the can head thus preventing the pin $h^{16}$ being moved by the spring $H^3$, and thus also preventing said pin $h^{16}$ from engaging the can body feed controller operating lever $K^1$. If, however, no can head is present on the face of the supplemental feeder $H^2$ directly above the short can head chute $C^1$, the spring $H^3$ will push the pin $h^{16}$ in sufficiently to cause it to engage the operating lever of the can body feed controller K and thus cause said controller to arrest or prevent the gravity feed of the can body into the pocket of the carrier when no can head is present on one of the can head seats of the supplemental feeder or delivery wheel H² and the spring H³ consequently slides the pin $h^{16}$ into position to engage the operating lever K¹ of the can body feed controller K, the pin $h^{16}$ is automatically returned to its normal position as the delivery wheel H² further rotates by means of a stationary cam $h^{20}$ on the frame of the machine.

M is a curved guard or guide device secured to the can head holder H and partially surrounding the supplemental can head feeder or delivery wheel H². to retain the can heads in position on the seats or faces of said wheel as it rotates, and to guide or direct them properly into the short can head chute C¹. The can head chute C¹ also is furnished at its upper end with a curved guide C² to aid in deflecting the can heads properly into the chute C¹.

N is the discharge chute for the seamed cans, the same receiving them from the pockets of the carrier as the carrier rotates.

We claim:—

1. In a continuous rotary double seaming machine, the combination with a continuously rotating carrier having a plurality of horizontally disposed can body receiving pockets and a plurality of can head seats for registering the can heads with the can bodies in the pockets of the carrier, of a plurality of pairs of axially rotatable can holder chucks mounted on the carrier, a plurality of sets of double seaming rollers mounted on the carrier, a can body chute, a can head chute, and means for preventing the delivery of a can body into a pocket of the carrier unless a can head is simultaneously delivered, substantially as specified.

2. In a continuous rotary double seaming machine, the combination with a continuously rotating carrier having a plurality of horizontally disposed can body receiving pockets and a plurality of can head seats for registering the can heads with the can bodies in the pockets of the carrier, of a plurality of axially rotatable can holder chucks mounted on the carrier, a plurality of sets of double seaming rollers mounted on the carrier, a can body chute, a can head chute, a can head feeder for releasing the can heads one by one from a pile or stack, and means for delivering the can heads one by one as so released into said can head chute, substantially as specified.

3. In a continuous, rotary double seaming machine, the combination with a continuously rotating carrier having a plurality of horizontally disposed can body receiving pockets and a plurality of can head seats for registering the can heads with the can bodies in the pockets of the carrier, of a plurality of axially rotatable can holder chucks mounted on the carrier, a plurality of sets of double seaming rollers mounted on the carrier, a can body chute, a can head chute, a can head feeder for releasing the can heads one by one from a pile or stack, and a rotary supplemental can head feeder interposed between said first mentioned feeder and said can head chute, and having a plurality of can head seats, substantially as specified.

4. In a continuous, rotary double seaming machine, the combination with a continuously rotating carrier having a plurality of horizontally disposed can body receiving pockets and a plurality of can head seats for registering the can heads with the can bodies in the pockets of the carrier, of a plurality of axially rotatable can holder chucks mounted on the carrier, a plurality of sets of double seaming rollers mounted on the carrier, a can body chute, a can head chute, a can head feeder for releasing the can heads one by one from a pile or stack, and a rotary supplemental can head feeder interposed between said first mentioned feeder and said can head chute, and having a plurality of can head seats, said can head chute having a guide at the upper end thereof for deflecting the can heads into said chute as they are discharged from said supplemental feeder, substantially as specified.

5. In a continuous, rotary double seaming machine, the combination with a continuously rotating carrier having a plurality of horizontally disposed can body receiving pockets and a plurality of can head seats for registering the can heads with the can bodies in the pockets of the carrier, of a plurality of axially rotatable can holder chucks mounted on the carrier, a plurality of sets of double seaming rollers mounted on the carrier, a can body chute, a can head chute, a can head feeder for releasing the can heads one by one from a pile or stack, a rotary supplemental can head feeder interposed between said first mentioned feeder and said can head chute, and having a plurality of can head seats, and a guard adjacent to said supplemental feeder for holding the can heads on the seats thereof and deflecting them into said can head chute, substantially as specified.

6. In a continuous rotary double seaming machine, the combination with a continuously rotating carrier having a plurality of horizontally disposed can body receiving pockets and a plurality of can head seats for registering the can heads with the can bodies in the pockets of the carrier, of a plurality of axially rotatable can holder chucks mounted on the carrier, a plurality of sets of double seaming rollers mounted on the carrier, a can body chute, a can head chute, a can head feeder for releasing the can heads one by one from a pile or stack, a rotary supplemental can head feeder interposed between said first mentioned feeder and said can head chute, and having a plurality of can head seats, and a guard adjacent to said supplemental feeder for holding the can heads on the seats thereof and deflecting them into said can head chute, said can head chute having at the upper end thereof a guide to aid in deflecting the can heads into said chute, substantially as specified.

7. In a continuous, rotary double seaming machine, the combination with a continuously rotating carrier having a plurality of horizontally disposed can body receiving pockets and a plurality of can head seats for registering the can heads with the can bodies in the pockets of the carrier, of a plurality of axially rotatable can holder chucks mounted on the carrier, a plurality of sets of double seaming rollers mounted on the carrier, a can body chute, a can head chute, a can head feeder for releasing the can heads one by one from a pile or stack, and a rotary supplemental can head feeder interposed between said first mentioned feeder and said can head chute and having a plurality of can head seats, a can body feed controller, and means for causing said can body feed controller to be actuated in case no can head is on the seat of said supplemental feeder for delivery into said can head chute, substantially as specified.

8. In a continuous, rotatable double seaming machine, the combination with a continuously rotating carrier having a plurality of horizontally disposed can body receiving pockets and a plurality of can head seats for registering the can heads with the can bodies in the pockets of the carrier, of a plurality of axially rotatable can holder chucks mounted on the carrier, a plurality of sets of double seaming rollers mounted on the carrier, a can body chute, a can head chute, a can head feeder for releasing the can heads one by one from a pile or stack, and a rotary supplemental can head feeder interposed between said first mentioned feeder and said can head chute and having a plurality of can head seats, a can body feed controller, and means for causing said can body feed controller to be actuated in case no can head is on the seat of said supplemental feeder for delivery into said can head chute, said means including a movable device adapted to engage the can head if one is present on said seat of said supplemental feeder, substantially as specified.

9. In a continuous rotary double seaming machine, the combination with a continuously rotating carrier having a plurality of horizontally disposed can body receiving pockets and a plurality of can head seats for registering the can heads with the can bodies in the pockets of the carrier, of a plurality of axially rotatable can holder chucks mounted on the carrier, a plurality of sets of double seaming rollers mounted on the carrier, a can body chute, a can head chute, a can head feeder for releasing the can heads one by one from a pile or stack, and a rotary supplemental can head feeder interposed between said first mentioned feeder and said can head chute and having a plurality of can head seats, a can body feed controller, and means for causing said can body feed controller to be actuated in case no can head is on the seat of said supplemental feeder for delivery into said can head chute, said means including a movable device adapted to engage the can head if one is present on said seat of said supplemental feeder, and a spring for actuating said device as said supplemental feeder rotates, substantially as specified.

10. In a continuous rotary double seaming machine, the combination with a continuously rotating carrier having a plurality of horizontally disposed can body receiving pockets and a plurality of can head seats for registering the can heads with the can bodies in the pockets of the carrier, of a plurality of axially rotatable can holder chucks mounted on the carrier, a plurality of sets of double seaming rollers mounted on the carrier, a can body chute, a can head chute, a can head feeder for releasing the can heads one by one from a pile or stack, and a rotary supplemental can head feeder interposed between said first mentioned feeder and said can head chute and having a plurality of can head seats, a can body feed controller, and means for causing said can body feed controller to be actuated in case no can head is on the seat of said supplemental feeder for delivery into said can head chute, said means including a movable device adapted to engage the can head if one is present on said seat of said supplemental feeder, and a spring for actuating said device as said supplemental feeder rotates, said can body feed controller having an operating lever adapted to be engaged by said movable device on said rotary supplemental can head feeder, substantially as specified.

11. In a continuous, rotary double seaming machine, the combination with a continuously rotating carrier turning about a horizontal axis and having a plurality of horizontally disposed can body receiving pockets, of a plurality of axially rotatable can holder chucks mounted on said carrier one at each end of each of said pockets, a plurality of sets of double seaming rollers mounted on said carrier, and direct pressure means for actuating said seaming rollers as the carrier rotates, said means including a central cam and a direct pressure device interposed between and in line with said cam and each seaming roller, substantially as specified.

12. In a continuous, rotary double seaming machine, the combination with a continuously rotating carrier turning about a horizontal axis and having a plurality of horizontally disposed can body receiving pockets, of a plurality of axially rotatable can holder chucks mounted on said carrier one at each end of each of said pockets, a plurality of sets of double seaming rollers mounted on said carrier, and direct pressure means for actuating said seaming rollers as the carrier rotates, said means including a central stationary cam and radially disposed seaming roller slides, substantially as specified.

13. In a continuous rotary double seaming machine, the combination with a continuously rotating carrier having a plurality of can body receiving pockets, of a plurality of axially rotatable can holder chucks mounted on said carrier, a plurality of sets of double seaming rollers mounted on said carrier, and direct pressure means for actuating said seaming rollers as the carrier rotates, said means including a central stationary cam and radially disposed seaming roller slides, one for each seaming roller, each of said seaming roller slides having an adjustable member, substantially as specified.

14. In a continuous rotary double seaming machine, the combination with a continuously rotating carrier having a plurality of can body receiving pockets, of a plurality of axially rotatable can holder chucks mounted on said carrier, a plurality of sets of double seaming rollers mounted on said carrier, and direct pressure means for actuating said seaming rollers as the carrier rotates, said means including a central stationary cam and radially disposed seaming roller slides, one for each seaming roller, each of said seaming roller slides having an adjustable member, and an anti-friction roller for engagement with said cam, substantially as specified.

15. In a continuous rotary double seaming machine, the combination with a continuously rotating carrier having a plurality of can body receiving pockets, of a plurality of axially rotatable can holder chucks mounted on said carrier, a plurality of sets of double seaming rollers mounted on said carrier, and direct pressure means for actuating said seaming rollers as the carrier rotates, said means including a central stationary cam and radially disposed seaming roller slides, one for each seaming roller, each of said seaming roller slides having an adjustable member and an anti-friction roller for engagement with said cam, and each of said seaming roller slides having a connecting bolt provided with a wedge shaped head for adjusting its said members, substantially as specified.

16. In a continuous, rotary double seaming machine, the combination with a continuously rotating carrier having a plurality of can body receiving pockets, of a plurality of axially rotatable can holder chucks mounted on said carrier, a plurality of sets of double seaming rollers mounted on said carrier, and direct pressure means for actuating said seaming rollers as the carrier rotates, a central stationary cam, one of said chucks of each pair being a reciprocating one and provided with toggle link connections and a radial slide for operating the same by said stationary cam as the carrier rotates, substantially as specified.

17. In a continuous rotary double seaming machine, the combination with a continuously rotating carrier having a plurality of can pockets therein, a plurality of sets of double seaming rollers mounted on said carrier, a plurality of pairs of axially rotatable chucks mounted on said carrier, a reciprocating sleeve for actuating one of said chucks of each pair, a radial slide for each chuck operating sleeve, and toggle link connections between each of said radial slides and each of said chuck operating sleeves, and a cam for operating said slides as the carrier rotates, substantially as specified.

18. In a continuous rotary double seaming machine, the combination with a continuously rotating carrier having a plurality of can pockets therein, a plurality of sets of double seaming rollers mounted on said carrier, a plurality of pairs of axially rotatable chucks mounted on said carrier, a reciprocating sleeve for actuating one of said chucks of each pair, a radial slide for each chuck operating sleeve, and toggle link connections between each of said radial slides and each of said chuck operating sleeves, and a central stationary cam for operating said slides as the carrier rotates, substantially as specified.

19. In a continuous, rotary double seaming machine, the combination with a continuously rotating carrier turning about a horizontal axis and having a plurality of horizontally disposed can body receiving pockets, of a plurality of axially rotatable can holder chucks mounted on said carrier one at each end of each of said pockets, a plurality of sets of double seaming rollers mounted on said carrier, and direct pressure means for actuating said seaming rollers as the carrier rotates, said means including a central cam and a direct pressure device interposed between and in line with said cam and each seaming roller, and an external annular gear for rotating said carrier, substantially as specified.

20. In a continuous rotary double seaming machine, the combination with a continuously rotating carrier having a plurality of can pockets thereon, of a can body chute for delivering the can bodies one by one into the pockets of the carrier, a plurality of pairs of axially rotatable chucks mounted on the carrier, a plurality of sets of double seaming rollers mounted on the carrier, an external annular gear for rotating the carrier, a central driving shaft extending axially through the carrier and a train of connecting gearing between said driving shaft and said external annular gear on the carrier, substantially as specified.

21. In a continuous rotary double seaming machine, the combination with a continuously rotating carrier having a plurality of can body receiving pockets, of a plurality of axially rotatable can holder chucks mounted on said carrier, a plurality of sets of double seaming rollers mounted on said carrier, and direct pressure means for actuating said seaming rollers as the carrier rotates, said axially rotatable chuck of each pair which is opposed to said seaming rollers being outwardly yielding to accommodate the side seam of the can body, substantially as specified.

22. In a continuous rotary double seaming machine, the combination with a continuously rotating carrier having a plurality of can body receiving pockets, of a plurality of axially rotatable can holder chucks mounted on said carrier, a plurality of sets of double seaming rollers mounted on said carrier, direct pressure means for actuating said seaming rollers as the carrier rotates, said means including a central stationary cam and radially disposed seaming roller slides, and outwardly yielding bearings for the spindles of said axially rotatable chucks opposing the seaming rollers, substantially as specified.

23. In a continuous, rotary double seaming machine, the combination with a can body chute, of a can head chute adjacent thereto, a continuously rotating carrier turning about a horizontal axis and having a plurality of horizontally disposed can body receiving pockets and a plurality of can head seats, a plurality of axially rotatable chucks mounted on said carrier one at each end of each of said pockets and a plurality of sets of seaming rollers mounted on said carrier, each set comprising a plurality of independently movable seaming rollers and direct pressure means for actuating said seaming rollers as the carrier rotates said means including a stationary cam and a direct pressure device interposed between and in line with said cam and each of said seaming rollers substantially as specified.

24. In a continuous, rotary double seaming machine, the combination with a can body chute, of a can head chute adjacent thereto, a continuously rotating carrier turning about a horizontal axis and having a plurality of horizontally disposed can body receiving pockets, and a plurality of can head seats, a plurality of axially rotatable chucks mounted on said carrier one at each end of each of said pockets, a plurality of sets of seaming rollers mounted on said carrier, each set comprising a plurality of independently movable seaming rollers, and means for preventing the feed of a can body into a pocket of said carrier except in conjunction with a can head, substantially as specified.

25. In a continuous, rotary double seaming machine, the combination with a can body chute, of a can head chute adjacent thereto, a continuously rotating carrier turning about a horizontal axis and having a plurality of horizontally disposed can body receiving pockets and a plurality of can head seats, a plurality of axially rotatable chucks mounted on said carrier one at each end of each of said pockets, a plurality of sets of seaming rollers mounted on said carrier, each set comprising a plurality of independently movable seaming rollers, means for preventing the feed of a can body into a pocket of said carrier except in conjunction with a can head, said means including a can body feed controller and means for actuating the same, substantially as specified.

26. In a continuous, rotary double seaming machine, the combination with a can body chute, of a can head chute adjacent thereto, a continuously rotating carrier turning about a horizontal axis and having a plurality of horizontally disposed can body receiving pockets and a plurality of can head seats, a plurality of axially rotatable chucks mounted on said carrier, a plurality of sets of seaming rollers mounted on said carrier, each set comprising a plurality of independently movable seaming rollers, means for preventing the feed of a can body into a pocket of said carrier except in conjunction with a can head, said means including a can body feed controller and means for actuating the same governed by the can head, substantially as specified.

27. In a continuous rotary double seaming machine, the combination with a can body chute, of a can head chute adjacent therto, a continuously rotating carrier turning about a horizontal axis and having a plurality of horizontally disposed can body receiving pockets and a plurality of can head seats, a plurality of axially rotatable chucks mounted on said carrier, a plurality of sets of seaming rollers mounted on said carrier, each set comprising a plurality of independently movable seaming rollers, and means for preventing the feed of a can body into a pocket of said carrier except in conjunction with a can head, said means including a can body controller and can head governing means for actuating said controller, substantially as specified.

28. In a continuous, rotary double seaming machine, the combination with a can body chute, of a can head chute, a continuously rotating carrier having a plurality of can body receiving pockets, and a plurality of can head registering seats, a plurality of pairs of axially rotatable chucks mounted on said carrier, a plurality of sets of double seaming rollers mounted on said carrier, said carrier having an external annular gear through which it is rotated, radially disposed seaming roller slides, one for each seaming roller, and a central stationary cam for actuating said seaming rollers through said slides by direct pressure in line therewith, substantially as specified.

29. In a continuous rotary double seaming machine, the combination with a can body chute, of a can head chute, a continuously rotating carrier having a plurality of can body receiving pockets, and a plurality of can head registering seats, a plurality of pairs of axially rotatable chucks mounted on said carrier, a plurality of sets of double seaming rollers mounted on said carrier, said carrier having an external annular gear through which it is rotated, radially disposed seaming roller slides, one for each seaming roller, a central stationary cam for actuating said seaming rollers through said slides by direct pressure in line therewith, a plurality of slides mounted on said carrier, one for one chuck of each pair, a plurality of radial slides on said carrier, one for each chuck of each pair, toggle link connections between said slides and said radial slides, and a central stationary cam for actuating said radial slides as the carrier rotates, substantially as specified.

30. In a continuous, rotary double seaming machine, the combination with a can body chute, of a can head chute, a continuously rotating carrier having a plurality of can body receiving pockets and a plurality of can head registering seats, a plurality of pairs of axially rotatable chucks mounted on said carrier, a plurality of sets of double seaming rollers mounted on said carrier, said carrier having an external annular gear through which it is rotated, radially disposed seaming roller slides, one for each seaming roller, a central stationary cam for actuating said seaming rollers through said slides by direct pressure in line therewith, a plurality of slides mounted on said carrier, one for one chuck of each pair, a plurality of radial slides on said carrier, one for one chuck of each pair, toggle link connections between said slides and said radial slides, and a central stationary cam for actuating said radial slides as the carrier rotates, one of said chucks of each pair having a spindle furnished with a gear for rotating the same and a main central gear meshing with the gears on said chuck spindles as the carrier rotates, substantially as specified.

31. In a continuous, rotary double seaming machine, the combination with a can body chute, of a can head chute, a continuously rotating carrier having a plurality of can body receiving pockets and a plurality of can head registering seats, a plurality of pairs of axially rotatable chucks mounted on said carrier, a plurality of sets of double seaming rollers mounted on said carrier, said carrier having an external annular gear through which it is rotated, radially disposed seaming roller slides, one for each seaming roller, a central stationary cam for actuating said seaming rollers through said slides by direct pressure in line therewith, one of said chucks of each pair having a spindle furnished with a gear for rotating the same, and a main central gear meshing with the gears on said chuck spindles as the carrier rotates, substantially as specified.

32. In a continuous, rotary double seaming machine, the combination with a can body chute, of a can head chute, a continuously rotating carrier having a plurality of can body receiving pockets, and a plurality of can head registering seats, a plurality of pairs of axially rotatable chucks mounted on said carrier, a plurality of sets of double seaming rollers mounted on said carrier, a can head holder adapted to receive the can heads in a pile or stack, and rotary can head feeders furnished with can supporting points or projections for releasing or discharging the can heads one by one from the pile or stack as the feeders rotate, substantially as specified.

33. In a continuous, rotary double seaming machine, the combination with a can body chute, of a can head chute, a continuously rotating carrier having a plurality of can body receiving pockets and a plurality of can head registering seats, a plurality of pairs of axially rotatable chucks mounted on said carrier, a plurality of sets of double seaming rollers mounted on said carrier, a can head holder adapted to receive the can heads in a pile or stack, and rotary can head feeders furnished with can supporting points or projections for releasing or discharging the can heads one by one from the pile or stack as the feeders rotate, said supporting points being in two sets separated from each other the thickness of a can head and alternately arranged, substantially as specified.

34. In a continuous, rotary double seaming machine, the combination with a can body chute, of a can head chute, a continuously rotating carrier having a plurality of can body receiving pockets and a plurality of can head registering seats, a plurality of pairs of axially rotatable chucks mounted on said carrier, a plurality of sets of double seaming rollers mounted on said carrier, a can head holder adapted to receive the can heads in a pile or stack, rotary can head feeders furnished with can supporting points or projections for releasing or discharging the can heads one by one from the pile or stack as the feeders rotate, and a rotary can head delivery wheel having a plurality of can head seats interposed between said can head feeder and can head chute, substantially as specified.

35. In a continuous, rotary double seaming machine, the combination with a can body chute, of a can head chute, a continuously rotating carrier having a plurality of can body receiving pockets and a plurality of can head registering seats, a plurality of pairs of axially rotatable chucks mounted on said carrier, a plurality of sets of double seaming rollers mounted on said carrier, a can head holder adapted to receive the can heads in a pile or stack, rotary can head feeders furnished with can supporting points or projections for releasing or discharging the can heads one by one from the pile or stack as the feeders rotate, a rotary can head delivery wheel having a plurality of can head seats interposed between said can head feeder and can head chute, and can head governed means on said delivery wheel for actuating said can body feed controller, substantially as specified.

36. In a continuous rotary double seaming machine, the combination with a can body chute, of a can head chute, a continuously rotating carrier having a plurality of can body receiving pockets and a plurality of can head registering seats, a plurality of pairs of axially rotatable chucks mounted on said carrier, a plurality of sets of double seaming rollers mounted on said carrier, and a can head delivery wheel having a plurality of can head seats from which the can heads are discharged one by one into said can head chute, substantially as specified.

37. In a continuous rotary double seaming machine, the combination with a can body chute, of a can head chute, a continuously rotating carrier having a plurality of can body receiving pockets and a plurality of can head registering seats, a plurality of pairs of axially rotatable chucks mounted on said carrier, a plurality of sets of double seaming rollers mounted on said carrier, a can head delivery wheel having a plurality of can head seats from which the can heads are discharged one by one into said can head chute, a can body feed controller and can head governed means on said can head delivery wheel for actuating said can body feed controller, substantially as specified.

38. In a continuous rotary double seaming machine, the combination with a can body chute, of a can head chute, a continuously rotating carrier having a plurality of can body receiving pockets and a plurality of can head registering seats, a plurality of pairs of axially rotatable chucks mounted on said carrier, a plurality of sets of double seaming rollers mounted on said carrier, a can head delivery wheel having a plurality of can head seats from which the can heads are discharged one by one into said can head chute, a can body feed controller, can head governed means on said can head delivery wheel for actuating said can body feed controller, and a stationary spring adapted to be engaged by said can head governed means on said delivery wheel as it rotates, substantially as specified.

39. In a continuous rotary double seaming machine, the combination with a can body chute, of a can head chute, a continuously rotating carrier having a plurality of can body receiving pockets and a plurality of can head registering seats, a plurality of pairs of axially rotatable chucks mounted on said carrier, a plurality of sets of double seaming rollers mounted on said carrier, a can head delivery wheel having a plurality of can head seats from which the can heads are discharged one by one into said can head chute, a can body feed controller, can head governed means on said can head delivery wheel for actuating said can body feed controller, a can head holder for a stack of can heads and a rotary star shaped can head feeder having two sets of alternately arranged supporting points separated from each other the thickness of a can head, substantially as specified.

40. The combination with a holder for a stack of can heads, of a rotary star shaped feeder having two sets of supporting points alternately arranged and separated from each other the thickness of a can head, a carrier having a plurality of can head receiving seats thereon and means for automatically delivering the can heads to said carrier as they are fed one by one from said holder by said feeder, substantially as specified.

41. The combination with a holder for a stack of can heads, of a rotary star shaped feeder having two sets of supporting points alternately arranged and separated from each other the thickness of a can head, a can head delivery wheel having a plurality of can head seats and a can head chute to which the can heads are delivered by said wheel, substantially as specified.

42. The combination with a holder for a stack of can heads, of a rotary star shaped feeder having two sets of supporting points alternately arranged and separated from each other the thickness of a can head, a can head delivery wheel having a plurality of can head seats, a can head chute to which the can heads are delivered by said wheel, and a movable can head engaging device on said wheel for each of said can head seats, substantially as specified.

43. The combination with a holder for a stack of can heads, of a rotary star shaped feeder having two sets of supporting points alternately arranged and separated from each other the thickness of a can head, a can head delivery wheel having a plurality of can head seats, a can head chute to which the can heads are delivered by said wheel, a movable can head engaging device on said wheel for each of said can head seats, a can body chute, a can body feed controller therein and connecting means for actuating said controller by said movable can head engaging device on said delivery wheel as said wheel rotates, substantially as specified.

44. The combination with a can body chute, of a can head chute, a can body feed controller, a can head delivery wheel having a plurality of can head seats and a movable can head engaging device for each can head seat, and means for actuating said can body feed controller by said movable can head engaging device on said wheel as the same rotates, substantially as specified.

45. The combination with a can head chute, of a can head delivery wheel having a plurality of can head seats on the periphery thereof provided with projecting fingers to engage the can heads, said delivery wheel rotating about a horizontal axis parallel to the plane of the chute and delivering the can heads into said chute, substantially as specified.

46. In a seaming machine, the combination with a rotary carrier turning about a horizontal axis and having a plurality of horizontally disposed can receiving pockets, of a plurality of axially rotatable chucks on said carrier one at each end of each of said pockets, a plurality of seaming rollers mounted on said carrier, and direct pressure means for actuating said seaming rollers as the carrier rotates, said means including a central cam and a direct pressure device interposed between and in line with said cam and each seaming roller, substantially as specified.

47. In a continuous rotary seaming machine, the combination with a rotary carrier turning about a horizontal axis and having a plurality of horizontally disposed can pockets thereon, of a plurality of chucks on said carrier, one at each end of each of said pockets, a central stationary cam, a plurality of radial seaming roller slides actuated by said cam, a plurality of seaming rollers mounted on said slides and an external gear on the carrier through which it is rotated, substantially as specified.

48. The combination with a continuously rotating carrier having a plurality of can receiving pockets thereon, of a plurality of pairs of axially rotatable chucks mounted on said carrier, a central stationary cam, radially disposed slides actuated thereby and means for reciprocating one chuck of each of said pairs from said radial slides, substantially as specified.

49. The combination with a continuously rotating carrier having a plurality of can receiving pockets thereon, of a plurality of pairs of axially rotatable chucks mounted on said carrier, a central stationary cam, radially disposed slides actuated thereby, and means for reciprocating one chuck of each of said pairs from said radial slides, said means including toggle links, substantially as specified.

50. The combination with a can body chute, of a can head chute, and a can-head delivery wheel having a plurality of can-head seats thereon and a can body feed controller, a carrier having a plurality of can receiving pockets thereon, a plurality of chucks on said carrier, one at each end of each of said pockets and a plurality of sets of double seaming rollers on said carrier, one set for each of said pockets, substantially as specified.

51. The combination with a can body chute, of a can head chute, a can-head delivery wheel having a plurality of can-head seats thereon and a can body feed controller, and can head governed means on said delivery wheel for actuating said can body feed controller, substantially as specified.

52. The combination with a can body chute, of a can head chute, a can-head delivery wheel having a plurality of can-head seats thereon, and a can body feed controller, can head governed means on said delivery wheel for actuating said can body feed controller, said means including a series of slide pins on said wheel, a spring for actuating said pins as said wheel revolves to cause it to engage the can body feed controller operating lever, substantially as specified.

53. The combination with a can body chute, of a can head chute, a can head delivery wheel having a plurality of can head seats thereon, a can body feed controller, an operating lever for said can body feed controller, can head governed means on said delivery wheel for actuating said can body feed controller, said means including a series of slide pins on said delivery wheel, a spring for actuating said pins as said wheel revolves to cause them to engage said can body feed controller operating lever in case no can head is present on a can head seat, and a stationary cam for returning said slide pins to position after actuating said can body feed controller lever, substantially as specified.

54. In a rotary double seaming machine, the combination with a carrier rotatable about a horizontal axis, of a plurality of axially rotatable can holder chucks mounted on the carrier, a plurality of sets of double seaming rollers mounted on the carrier, and direct pressure means for actuating said seaming rollers as the carrier rotates, said means including a plurality of radially arranged, slidable pressure members each of which carries a seaming roller, said slidable members being radially guided on the carrier, substantially as specified.

55. In a continuous rotary double seaming machine, the combination with a carrier continuously rotatable about a horizontal axis, of a plurality of axially rotatable can holder chucks mounted on the carrier and bodily movable therewith, a plurality of sets of double seaming rollers mounted on the carrier, and means for actuating said seaming rollers, said means including a central cam and a direct pressure device interposed between and in line with said cam and each of the chucks, substantially as specified.

56. In a continuous, rotary double seaming machine, the combination with a continuously rotating carrier having a plurality of horizontally disposed can body receiving pockets, and a plurality of can head seats for registering the can heads with the can bodies in the pockets of the carrier, of a plurality of axially rotatable can holder chucks mounted on the carrier, a plurality of sets of double seaming rollers mounted on the carrier, a can head chute arranged to deliver can heads between said rotatable chucks, a can head feeder for releasing the can heads one by one from a pile or stack, and rotatable means having its axis arranged transversely to the axis of the carrier for delivering the can heads one by one as so released, into said can head chute, substantially as specified.

57. The combination with a carrier continuously rotatable about a horizontal axis, of a plurality of pairs of axially rotatable chucks mounted on said carrier, a central stationary cam, radially disposed slides actuated thereby, and means for reciprocating one chuck of each of said pairs from said radial slides, substantially as specified.

CHARLES J. NELSON.
OLAF OSTLIN.
EDWIN V. SWANGREN.

Witnesses:
H. M. MUNDAY,
ESTHER ABRAMS.